US009564933B2

(12) United States Patent
Murakami et al.

(10) Patent No.: US 9,564,933 B2

(45) Date of Patent: Feb. 7, 2017

(54) WIRELESS COMMUNICATION METHOD AND WIRELESS COMMUNICATION APPARATUS

(75) Inventors: Hiroko Murakami, Toyota (JP); Hiroki Okada, Toyota (JP); Arinobu Kimura, Toyota (JP); Kazuhiro Nakashima, Anjyo (JP)

(73) Assignees: TOYOTA JIDSOHA KABUSHIKI KAISHA, Toyota-shi (JP); DENSO CORPORATION, Kariya-shi (JP)

( * ) Notice: Subject to any disclaimer, the term of this patent is extended or adjusted under 35 U.S.C. 154(b) by 705 days.

(21) Appl. No.: 13/820,597

(22) PCT Filed: Sep. 6, 2011

(86) PCT No.: PCT/JP2011/070200

§ 371 (c)(1), (2), (4) Date: May 14, 2013

(87) PCT Pub. No.: WO2012/033066

PCT Pub. Date: Mar. 15, 2012

(65) Prior Publication Data

US 2013/0225093 A1 Aug. 29, 2013

(30) Foreign Application Priority Data

Sep. 6, 2010 (JP) ................................ 2010-199158

(51) Int. Cl.

*H04B 7/00* (2006.01)
*H04B 1/00* (2006.01)
(Continued)

(52) U.S. Cl.

CPC ............. *H04B 1/005* (2013.01); *H04W 24/00* (2013.01); *G07C 9/00309* (2013.01);
(Continued)

(58) Field of Classification Search

CPC ........ H04W 24/00; H04W 4/04; H04W 72/02; H04W 76/048
(Continued)

(56) References Cited

U.S. PATENT DOCUMENTS 6,154,513 A * 11/2000 Tachibana ......... H03M 13/2764 375/340
2003/0109276 A1* 6/2003 Wilson ................ H04B 1/0057 455/552.1
(Continued)

FOREIGN PATENT DOCUMENTS

| | | |
|---|---|---|
| JP | 63 296419 | 12/1988 |
| JP | 2003 87180 | 3/2003 |
| JP | 2005 260670 | 9/2005 |
| JP | 2005 333351 | 12/2005 |
| JP | 2007 202133 | 8/2007 |
| JP | 2008 187558 | 8/2008 |
| JP | 2008 266973 | 11/2008 |
| JP | 2009 33529 | 2/2009 |
| JP | 2009 171554 | 7/2009 |

OTHER PUBLICATIONS

International Preliminary Report on Patentability issued Mar. 6, 2013, in International Application No. PCT/JP2011/070200 (English translation only).
International Search Report Issued Oct. 11, 2011 in PCT/JP11/70200 Filed Sep. 6, 2011.

*Primary Examiner* — Wesley Kim
*Assistant Examiner* — Raj Chakraborty
(74) *Attorney, Agent, or Firm* — Oblon, McClelland, Maier & Neustadt, L.L.P.

(57) ABSTRACT

A wireless communication method is provided. This method includes: selecting one of a plurality of predetermined frequency bands each time a switch operation is manually performed in a transmitter, and then using the selected frequency band to transmit a radio signal corresponding to the switch operation for a predetermined specified transmission time; in a receiver apparatus, receiving the transmitted wireless signal, and then recognizing the content of a command that has already been assigned in accordance with the switch operation; and defining an intermittent reception standby period, which is repeated at a predetermined cycle for each of the frequency bands.

12 Claims, 8 Drawing Sheets

(51) Int. Cl.
*H04W 24/00* (2009.01)
*G07C 9/00* (2006.01)
*H04W 4/04* (2009.01)
*H04W 72/02* (2009.01)
*H04W 76/04* (2009.01)

(52) U.S. Cl.
CPC .......... *G07C 2209/61* (2013.01); *H04W 4/04* (2013.01); *H04W 72/02* (2013.01); *H04W 76/048* (2013.01)

(58) Field of Classification Search
USPC .......................................................... 455/71
See application file for complete search history.

(56) References Cited

U.S. PATENT DOCUMENTS

2008/0258870 A1* 10/2008 Sugiura .................. B60R 25/24 340/7.23
2010/0120374 A1 5/2010 Imai et al.
2010/0316099 A1* 12/2010 Sugita .................. G06F 1/3287 375/219
2012/0092205 A1* 4/2012 Bourdelais ............. G01S 7/282 342/21

* cited by examiner control unit
switch
110
100S
ON operation
120
reception unit
140
transmission unit
130
transmitter
reception antenna
141
transmission antenna
131
portable device
100
200R
receiver
in-vehicle device
200
transmission antenna
241
reception antenna
221
transmission unit
240
reception unit
220
210
communication control device
vehicle control device
230
trunk
232
door lock device
231 transmitter receiver

Ts (500ms)
CH2 (RKE transmission)
T1 (CH1)
T2 (CH2)
Tpa1 (250ms)
Tpa2 (250ms)
Tpb1 (400ms)
Tpb2 (400ms)
Tx
normal state (non-power saving mode)
power saving mode transmitter receiver Ts (500ms)
CH2 (RKE transmission)
T1 (CH1)
T2 (CH2)
Tpa1
(250ms)
Tpa2
(250ms)
Tx
normal state (non-power saving mode)
Ts (500ms)
T1 (CH1) T2 (CH2)
Tpb1
(400ms)
Tpb2
(400ms)
power saving mode transmitter receiver Ts (500ms)
CH2 (RKE transmission)
Tpa1 (250ms)
Tpa2 (250ms)
Tx
normal state (non-power saving mode)
Ts (500ms)
T1 (CH1)
Tpb1 (400ms)
power saving mode 10
11
control unit
memory
12
transmission unit
12a
13
operation unit
Lock/unlock operation signal
20
21
communication control unit
memory
22
reception unit
22a
23
door lock device

WIRELESS COMMUNICATION METHOD AND WIRELESS COMMUNICATION APPARATUS

FIELD OF THE INVENTION

The present invention relates to a wireless communication method and a wireless communication apparatus that uses the wireless communication method, and in particular, to a method and an apparatus advantageously adopted in a multi-channel remote keyless entry (RKE) system and the like.

BACKGROUND OF THE INVENTION

Generally, in a wireless communication apparatus for remotely operating a security device and the like such as the remote keyless entry system and like, mutual communication is carried out in a wireless manner between a portable device (transmitter), which is held by a vehicle user and has a transmitting and receiving function, and an in-vehicle device (receiver) including a communication control device having the same transmitting and receiving function. With such mutual communication, the door lock of the vehicle can be automatically locked and unlocked, and the engine can be started.

Such a wireless communication apparatus often uses a "multi-channel" method for mutual communication between the portable device and the in-vehicle device. In the multi-channel method, one frequency band is selected from multiple frequency bands prepared in advance to be used in the mutual communication. The frequency band to be used in the mutual communication is automatically switched each time the user operates the portable device. Therefore, even if the mutual communication at the selected frequency band is interfered due to degradation in a communication environment caused by noise and the like, the frequency band used in the mutual communication can be appropriately switched from a frequency band with large influence of noise to a frequency band with small influence of noise by switching the frequency band.

A periodic checking by the frequency band specified in advance is carried out between the portable device and the in-vehicle device to periodically check whether or not the portable device complies with the standard of the in-vehicle device.

Thus, the mutual communication, which uses the frequency band to be switched through input operation of the user, and the mutual communication, which uses a specific frequency band for periodic checking, are carried out between the portable device and the in-vehicle device. In other words, the portable device transmits a signal of an unknown frequency band switched through the input operation of the user and a signal of a known frequency band specified in advance to the in-vehicle device. Thus, it is difficult for the in-vehicle device to stably receive all the signals transmitted from the portable device. This leads to lowering in communication success rate between the portable device and the in-vehicle device.

A wireless communication apparatus described in Patent Document 1, for example, thus has been proposed to stably establish the mutual communication between the portable device and the in-vehicle device using multiple frequency bands. FIGS. 7 to 9 show an outline of the wireless communication apparatus.

As shown in FIG. 7, the wireless communication apparatus includes a portable device 10 having a wireless communication function, and a communication control device 20, which is mounted on a vehicle and used as a door lock/unlock device for performing a lock/unlock control of a door lock of the vehicle, for example.

The portable device 10 includes a mutual communication function for communicating with the communication control device 20. An operation command made by the user of the vehicle is input to an operation unit 13. The operation unit 13 transmits the input operation command to a control unit 11 serving as control means, which is a computer unit including a CPU, a ROM, a RAM, and the like. The control unit 11 thereby generates various operation signals such as a lock operation signal and an unlock operation signal for locking/unlocking the door lock of the vehicle in response to the operation command from the operation unit 13. The generated operation signal is output to a transmission unit 12. The transmission unit 12 modulates the operation signal input from the control unit 11 to a radio wave having a predetermined frequency, and transmits the modulated operation signal to outside via a transmission antenna 12*a*. The transmission unit 12 can modulate the operation signal to the radio wave of plural types of frequencies, and can change the transmitting frequency in accordance with a frequency control signal input from the control unit 11.

In the portable device 10 as described above, the control unit 11 successively transmits six data frames (first to six data frames) when transmitting the lock/unlock operation signal. In this case, the control unit 11 outputs a frequency switching signal to the transmission unit 12, so that the frequency channel is switched to a first channel or a second channel, and the lock/unlock operation signal can be transmitted over both channels.

As shown in FIG. 8, the transmission unit 12 includes two transmission circuits; a first transmission circuit 31 and a second transmission circuit 32. The transmission unit 12 further includes a first switch 33 arranged between the control unit 11 and the transmission circuits 31 and 32, and a second switch 34 arranged between the transmission antenna 12*a* and the transmission circuits 31 and 32. The first transmission circuit 31 modulates an operation signal input from the control unit 11 to a signal having a first frequency fa, and transmits the modulated signal to outside via the transmission antenna 12*a*. On the other hand, the second transmission circuit 32 modulates an operation signal input from the control unit 11 to a signal having a second frequency fb different from the first frequency fa, and transmits the modulated signal to outside via the transmission antenna 12*a*. The switches 33 and 34 switch between a connection state of "control unit 11-first transmission circuit 31-transmission antenna 12*a*" and a connection state of "control unit 11-second transmission circuit 32-transmission antenna 12*a*".

The communication control device 20 includes a communication control unit 21 serving as communication control means, which is a computer unit that includes a CPU, a ROM, a RAM, and the like, as shown in FIG. 7. The communication control device 20 has a reception antenna 22*a* for receiving the radio wave (lock/unlock operation signal) transmitted via the transmission antenna 12*a*. The lock/unlock operation signal received by the reception antenna 22*a* is input to a reception unit 22. The reception unit 22 demodulates the lock/unlock operation signal transmitted from the portable device 10 to a pulse signal, and outputs the pulse signal to the communication control unit 21. The communication control unit 21 performs a drive control of a door lock device 23 in accordance with the demodulated lock/unlock operation signal. The door lock of the vehicle is thereby locked/unlocked.

As shown in FIG. 9, the reception unit 22 includes a high frequency filter 61, a high frequency amplifier 62, an image cancelling mixer 63, an intermediate wave filter 64, an intermediate wave amplifier 65, and a demodulation circuit 66. These elements are connected in that order between the reception antenna 22*a* and the communication control unit 21. The reception unit 22 further includes a first local oscillator 68*a* capable of detecting the radio wave having the first frequency fa, and a second local oscillator 68*b* capable of detecting the radio wave having the second frequency fb. A switch 67 is connected between the first and second local oscillators 68*a*, 68*b*, and the image cancelling mixer 63. The switch 67 switches between a connection state of "image cancelling mixer 63-first local oscillator 68*a*" and a connection state of "image cancelling mixer 63-second local oscillator 68*b*". In other words, the reception unit 22 can detect the radio wave having the first frequency fa in a state where the image cancelling mixer 63 and the first local oscillator 68*a* are connected, and can detect the radio wave having the second frequency fb in a state where the image cancelling mixer 63 and the second local oscillator 68*b* are connected.

In such a wireless communication apparatus, the lock/unlock operation signal is modulated to the radio wave of different frequencies such as the first frequency fa and the second frequency fb by switching the connection states of the switches 33 and 34 arranged in the portable device. In the communication control device 20, the connection state of the switch 67 is switched to receive the different frequencies, the first and second frequencies fa, fb, so that the first and second frequencies fa, fb are detected by the first and second local oscillators 68*a*, 68*b*, respectively. The portable device 10 then is capable of transmitting the radio wave of different frequencies selected in accordance with the communication environment, and the communication control device 20 is capable of receiving the radio wave having the selected frequency.

PRIOR ART DOCUMENT

Patent Document

Patent Document 1: Japanese Laid-Open Patent Publication No. 2008-187558

SUMMARY OF THE INVENTION

According to such a wireless communication apparatus, when receiving signals of different frequencies, the switch 67 is switched according to the frequency of the signal to be received so that the first and second local oscillators 68*a*, 68*b* are activated each time. Thus, increase in the activation frequency and the activation current of the first and second local oscillators 68*a*, 68*b* is inevitable. Furthermore, the battery voltage (power) of the vehicle mounted with such a wireless communication apparatus may be lowered.

Since such a wireless communication apparatus is normally driven at the time of parking of the vehicle, the reception circuit of the in-vehicle device is activated in a predetermined time interval to be in a reception standby state to reduce the power consumption. Therefore, the in-vehicle device can only intermittently receive the radio wave transmitted from the portable device. The portable device, on the other hand, transmits the radio wave only for a predefined limited time with respect to one portable device operation. In other words, the portable device 10 transmits the radio wave having a frequency band selected from multiple frequency bands for 500 ms, for example, from when the portable device operation is performed. When intermittently receiving multiple frequency bands by the in-vehicle device in the reception standby state, the standby time for each frequency band is set short compared to when receiving only one frequency band. Thus, the opportunity to receive each frequency band inevitably reduces, and reliability in the communication between the portable device and the in-vehicle device also is inevitably lowered, such that the in-vehicle device cannot correctly receive the radio wave transmitted from the portable device.

Not limited to the remote keyless entry system described above, such a problem commonly exists more or less in a wireless communication apparatus that performs mutual communication between a receiver and a transmitter by switching multiple frequency bands.

It is an objective of the present invention to provide a wireless communication method and a wireless communication apparatus capable of maintaining high communication establishment in mutual communication between a transmitter and a receiver over multiple frequency bands.

To achieve the foregoing objective and in accordance with one aspect of the present invention, a wireless communication method is provided. The method includes: switching a frequency band among a plurality of predetermined frequency bands each time a manual switch operation is performed with a transmitter to transmit a wireless signal corresponding to the manual switch operation using the frequency band during a predetermined specified transmission time; receiving the transmitted wireless signal with a receiver and recognizing a command content assigned in advance in correspondence with the switch operation; defining an intermittent reception standby period, which is repeated at a predetermined cycle for each of the frequency bands, the receiver being capable of receiving the wireless signal transmitted using each of the frequency bands during the corresponding reception standby period; and setting the cycle of the reception standby period corresponding to each of the frequency bands to be smaller than or equal to the specified transmission time.

DETAILED DESCRIPTION OF THE PREFERRED EMBODIMENTS

First Embodiment

A wireless communication method and a wireless communication apparatus according to a first embodiment of the present invention will be hereinafter described with reference to FIGS. 1 to 3. The wireless communication apparatus to which the wireless communication method of the present embodiment is applied is an apparatus that adopts a multi-channel method, in which transmission and reception of wireless communication are carried out using two or more frequency bands, and that is used in a remote keyless entry system, in which locking/unlocking of a door, trunk, and the like of a vehicle serving as a control target mounted on the vehicle is remotely operated from a portable device.

Figure 1:
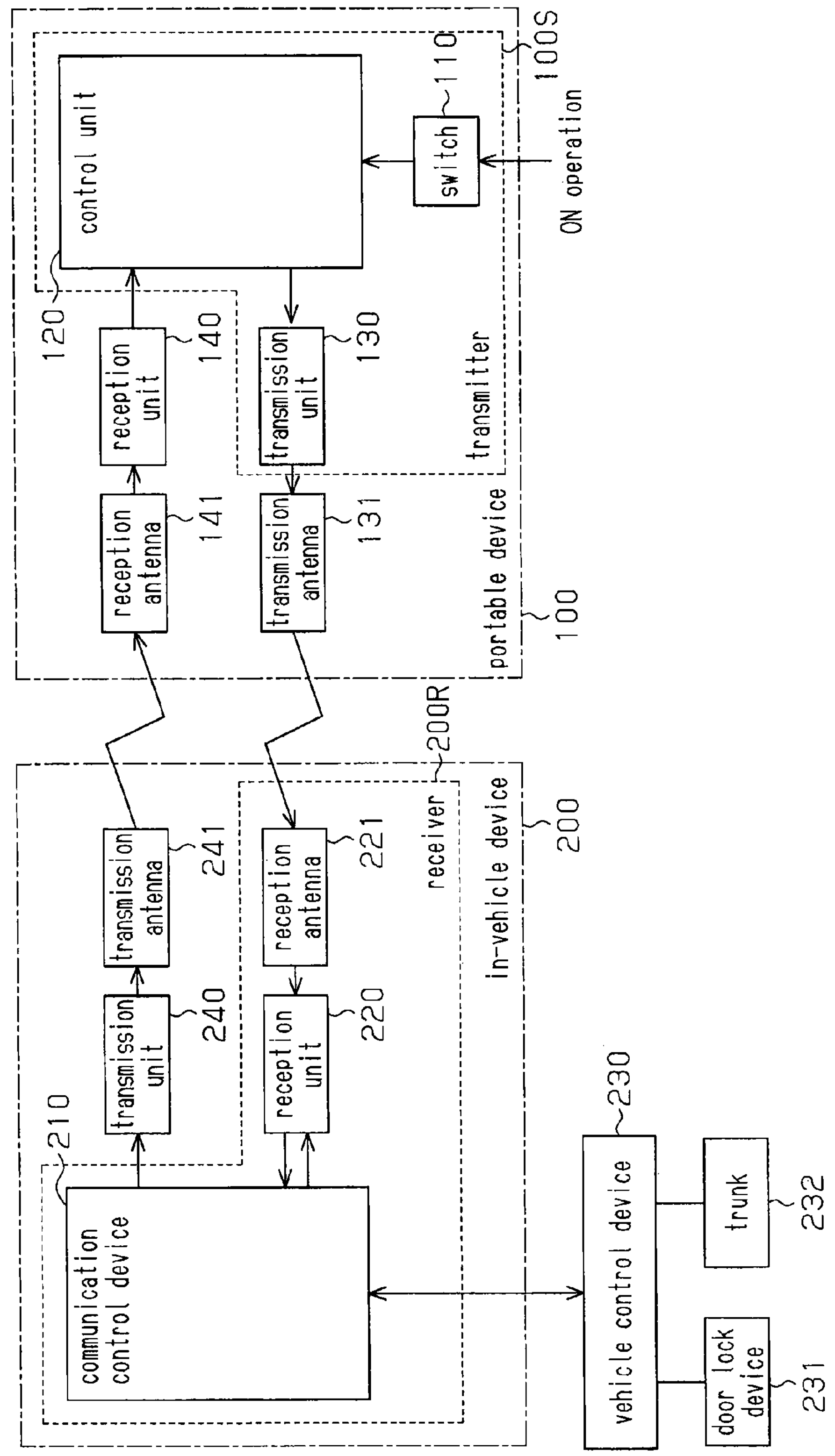
FIG. 1 is a schematic block diagram of a wireless communication apparatus to which a wireless communication method according to a first embodiment of the present invention is applied.

As shown in FIG. 1, the wireless communication apparatus includes a portable device 100 and an in-vehicle device 200. The portable device 100 is carried by a user to remotely operate locking/unlocking of a door, trunk, and the like of the vehicle. The in-vehicle device 200 is mounted on the vehicle to recognize an operation content of the portable device 100 through wireless communication with the portable device 100 and issue a control command related to the locking/unlocking, and the like as needed.

The portable device 100 includes a switch 110 to be pushed (switched) by a user of the vehicle for the remote operation. The switch 110 is an automatic returning type push switch (button switch) that is normally turned OFF, and is maintained in the ON state while the user is carrying out the switch operation and is automatically returned to the OFF state while the user is not carrying out the switch operation. In the present embodiment, the frequency band is switched among a plurality of predetermined frequency bands once the switch operation is performed on the switch 110, and a wireless signal corresponding to such switch operation is transmitted from the portable device 100 with a predetermined specified time as a unit by the selected frequency band. In the present embodiment, the specified time, which is the transmission unit, is about 500 ms.

A number of operations are defined for the switch 110. For example, the operation in which the switch operation of a short time (short time ON operation) by the user is carried out once within a predetermined time, that is, "one-short-pushing operation" is defined as the operation for carrying out the locking/unlocking of the door lock of the vehicle. Furthermore, for example, the operation in which the short time ON operation is carried out twice within the predetermined time, that is, "two-short-pushing operation" is defined as the operation for carrying out the locking/unlocking of the trunk of the vehicle. In the present embodiment, the frequency band used in the wireless communication between the portable device 100 and the in-vehicle device 200 is automatically switched among the two or more predetermined frequency bands each time the "one-short-pushing operation" serving as a first ON operation mode is carried out.

When the user performs the switch operation through the switch 110, an operation signal corresponding to each switch operation mode is input to a control unit 120 through the switch 110. The control unit 120 automatically switches the frequency band used in the wireless communication between the portable device 100 and the in-vehicle device 200 among the two or more predetermined frequency bands each time the user performs the switch operation.

Thus, in the portable device 100, the control unit 120 switches the frequency band used in the wireless communication among the predetermined frequency bands and a transmission unit 130 transmits a wireless signal corresponding to the input switch operation to the in-vehicle device 200 via a transmission antenna 131 each time the user performs the switch operation through the switch 110.

The portable device 100 further includes a reception antenna 141 and a reception unit 140 for receiving the wireless communication transmitted from the in-vehicle device 200, in response to the wireless communication transmitted from the portable device 100 or to perform periodic checking against the portable device 100.

In the present embodiment, the switch 110, the control unit 120, and the transmission unit 130 form a transmitter 100S, as shown in FIG. 1.

On the other hand, in the in-vehicle device 200, which carries out communication with the portable device 100, a reception unit 220 reads the wireless signal transmitted from the portable device 100 through a reception antenna 221. The reception unit 220 receives the wireless signal transmitted from the portable device 100, and recognizes the command content assigned in advance in correspondence with the switch operation of the switch 110 based on the received wireless signal. The reception unit 220 appropriately switches the receivable frequency bands according to the command from the reception unit 220 or a communication control device 210 for controlling various types of devices to be capable of receiving the wireless communication using multiple frequency bands transmitted from the portable device 100. The reception unit 220 inputs the recognized command content to the communication control device 210.

The communication control device 210 transmits to a vehicle control device 230 a command that prompts control of locking/unlocking and the like of various types of devices such as a door lock device 231 and a trunk 232 serving as a control target, according to the command content from the portable device 100 recognized by the reception unit 220. In other words, if the "one-short-pushing operation" is input through the switch 110, the vehicle control device 230, which has received the command, performs a control to lock/unlock the door lock device 231. If the "two-short-pushing operation" is input through the switch 110, the vehicle control device 230, which has received the command, performs a control to lock/unlock the trunk 232.

A transmission unit 240 transmits to the portable device 100, through a transmission antenna 241 over the frequency band specified in advance, the wireless communication for periodic checking of whether or not the communication has been established between the in-vehicle device 200 and the portable device 100, and whether or not the communication device that has performed wireless communication with respect to the in-vehicle device 200 complies with the standard of the in-vehicle device 200.

In the present embodiment, the communication control device 210, the reception unit 220, and the reception antenna 221 form a receiver 200R, as shown in FIG. 1. The receiver 200R includes a power saving mode for reducing the power consumption of the receiver 200R and a non-power saving mode, which is the normal standby mode. For example, the receiver 200R is in the power saving mode when the parking/stopping time of the vehicle is greater than or equal to a predetermined time or at the end of the periodic checking against the portable device 100, and the like.

Figure 2:
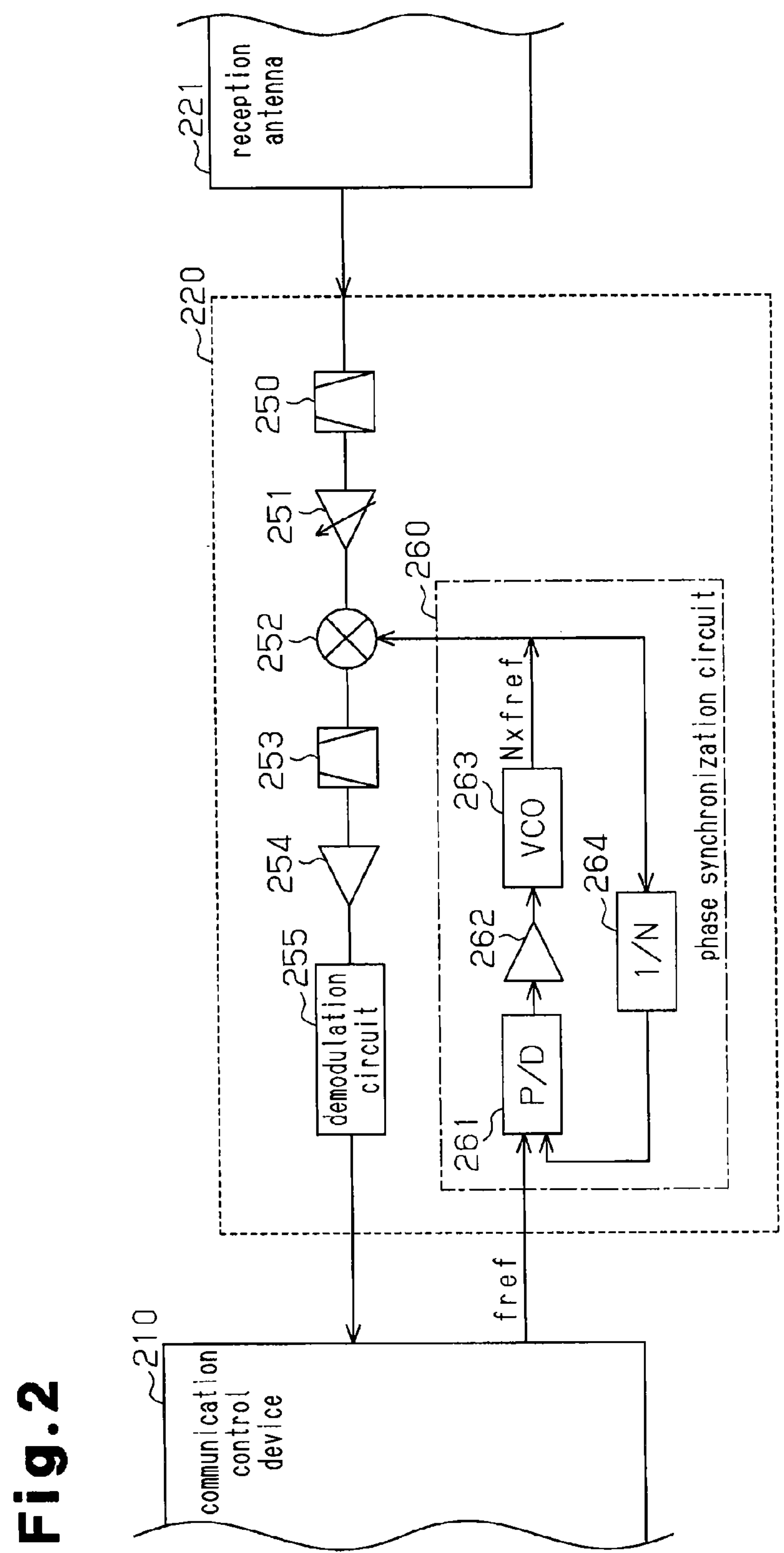
FIG. 2 is a schematic block diagram of a receiver of FIG. 1.

FIG. 2 shows a schematic configuration of the reception unit 220 in the receiver 200R.

As shown in FIG. 2, the reception unit 220 includes a high frequency filter 250, a high frequency amplifier 251, an image cancelling mixer 252, an intermediate wave filter 253, an intermediate wave amplifier 254, and a demodulation circuit 255 arranged in that order between the reception antenna 221 and the communication control device 210. The reception unit 220 further includes a phase synchronization circuit (PLL circuit) 260 for changing the receivable frequency band according to the frequency band of the wireless signal transmitted from the portable device 100. The phase synchronization circuit 260 is connected between the image cancelling mixer 252 and the communication control device 210. The elements 250 to 255 and 260 in the reception unit 220 form a reception circuit. The configurations and functions of the elements 250 to 255 in the reception unit 220 are well known, and thus the detailed description thereof will be omitted herein.

The phase synchronization circuit 260 is activated by the communication control device 210, and a reference frequency fref is input from the communication control device 210. A phase detector 261 retrieves the reference frequency fref and outputs as a voltage the phase difference between the reference frequency fref and an output signal of an N frequency divider 264 to a loop filter 262. The loop filter 262 integrates output results of the phase detector 261, and outputs as a voltage the integrated signal to a voltage control oscillator (VCO) 263. The VCO 263 determines the output frequency in accordance with the voltage value.

In the phase synchronization circuit 260 as described above, the phase detector 261, the loop filter 262, the VCO 263, and the N frequency divider 264 cooperatively operate to perform phase synchronization operation, thereby determining the output frequency N×fref. The output frequency N×fref is output to the image cancelling mixer 252, so that the reception unit 220 can receive a wireless signal of the frequency band corresponding to the output frequency N×fref input from the phase synchronization circuit 260.

In the present embodiment, the communication control device 210 functions as an activating unit for activating the reception circuit in the reception unit 220, and also functions as a control unit for switching the receivable frequency bands through the control of the reception unit 220. In the present embodiment, the receiver 200R including the reception unit 220 is mainly activated at the time of parking and stopping of the vehicle and is activated under a predetermined interval to reduce the power consumption. Therefore, the radio wave transmitted from the portable device 100 can be intermittently received.

The wireless communication method of the present embodiment carried out on the basis of the above will be hereinafter described with reference to FIG. 3. In FIG. 3, FIG. 3(*a*) shows one example of the wireless signal transmitted from the portable device 100 under the set specified time, and FIG. 3(*b*) shows a transition example of a reception standby period defined for the receiver 200R as a period in which the wireless signal can be received. FIG. 3(*c*) shows a transition example of a standby state (power saving mode/non-power saving mode) of the receiver 200R.

In the present embodiment, a first frequency band CH1 and a second frequency band CH2 are specified as a plurality of predetermined frequency bands between the transmitter 100S and the receiver 200R. The first frequency band CH1 is specified as the frequency band for periodic communication in which the periodic checking is carried out.

Figures 3A, 3B, 3C:
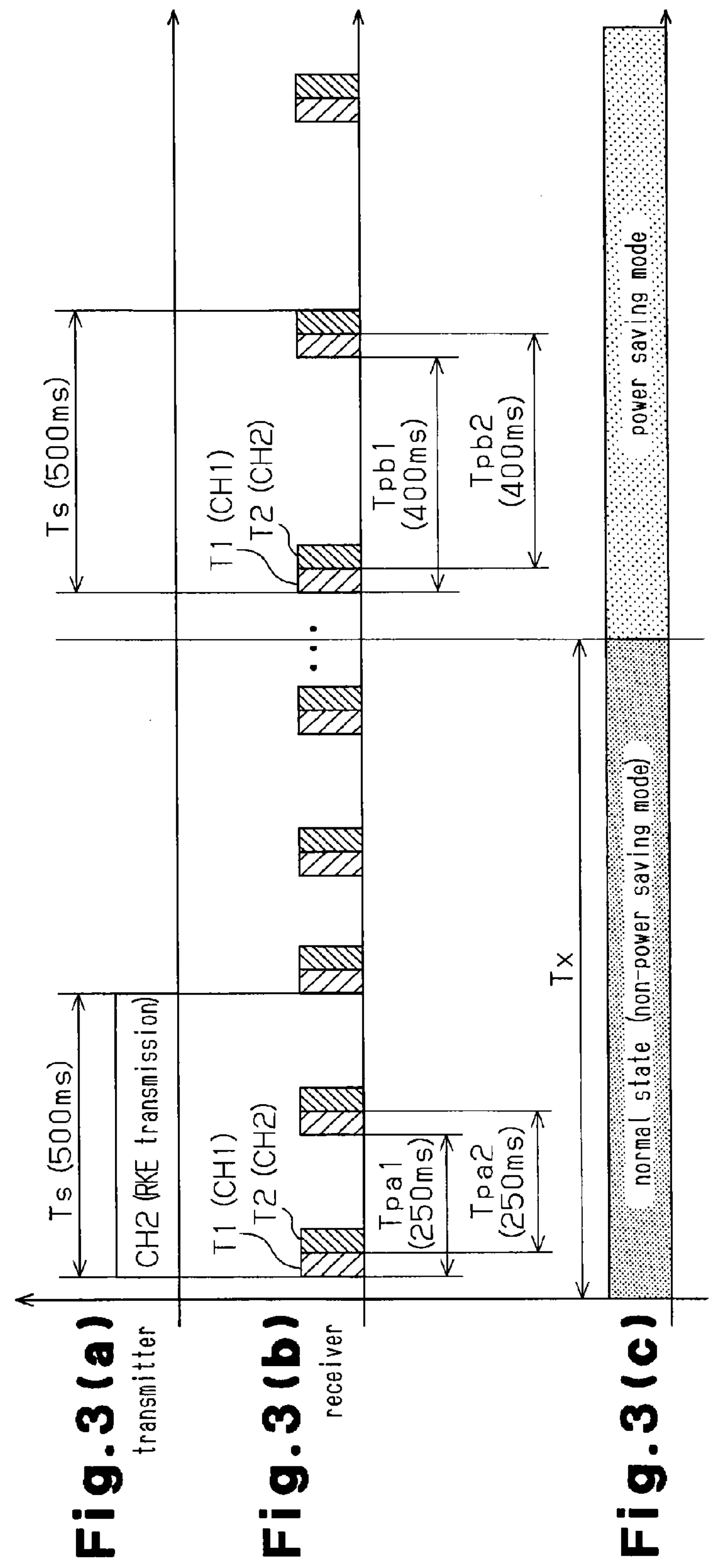
FIGS. 3(*a*) to 3(*c*) are timing charts showing one example of reception of wireless signals by the receiver of FIG. 2.

As shown in FIG. 3(*a*), in the present embodiment, when the switch operation is performed by the user, the wireless signal of the second frequency band CH2 switched from the first frequency band CH1, for example, is transmitted for about 500 ms as the specified time Ts. When performing the periodic communication, the wireless communication by the first frequency band CH1 defined in advance between the receiver 200R and the transmitter 100S is similarly carried out at each predetermined interval with the specified time Ts as a unit.

The receiver 200R is intermittently activated to reduce the power consumption at the time of parking and stopping of the vehicle, and hence the wireless signal transmitted from the portable device 100 can be received only in the intermittent periods. The portable device 100 transmits the wireless signal only for the limited specified time Ts specified in advance. When receiving multiple frequency bands with the receiver 200R, which is intermittently in the reception standby state, the opportunity to receive each frequency band inevitably reduces, and the in-vehicle device 200 does not necessarily need to be capable of correctly receiving the wireless signal transmitted from the portable device 100.

In the present embodiment, the reception standby period in the receiver 200R is defined separately for the first frequency band CH1 and the second frequency band CH2, and the cycle of each defined reception standby period is set to be smaller than or equal to the specified time Ts, which is the unit of transmission of the wireless signal.

In other words, as shown in FIG. 3(*b*), the receiver 200R can receive the first frequency band CH1 and the second frequency band CH2 in a first reception standby period T1 and a second reception standby period T2, respectively. As shown in FIGS. 3(*b*) and 3(*c*), a cycle Tpa1 of the first reception standby period T1, in which the wireless signal of the first frequency band CH1 can be received, is 250 ms, which is a half of the specified time Ts in the non-power saving mode. The second reception standby period T2 is arranged by reference to the first reception standby period T1. In the present embodiment, the second reception standby period T2, which corresponds to the second frequency band CH2, is temporally continuously arranged immediately after the first reception standby period T1, which corresponds to the first frequency band CH1. A cycle Tpa2 of the second reception standby period T2 in the non-power saving mode is also 250 ms, which is a half of the specified time Ts. The cycles Tpa1, Tpa2 of the first and second reception standby periods T1, T2 in the non-power saving mode correspond to a first cycle.

As shown in FIGS. 3(*b*) and 3(*c*), a cycle Tpb1 of the first reception standby period T1, in which the wireless signal of the first frequency band CH1 can be received, is 400 ms, which is smaller than or equal to the specified time Ts in the power saving mode. A cycle Tpb2 of the second reception standby period T2 continuously arranged immediately after the first reception standby period T1 is also 400 ms, which is smaller than or equal to the specified time Ts. The cycles Tpb1, Tpb2 of the first and second reception standby periods T1, T2 in the power saving mode correspond to a second cycle.

As a result, the first and second reception standby periods T1, T2 are included at any timing in the one specified time Ts, which is the unit of transmission of the wireless communication by the portable device 100. The in-vehicle device 200 thus can reliably receive the wireless signals of the frequency bands CH1 and CH2 even if it is unknown whether the frequency band of the wireless signal transmitted from the portable device 100 is the frequency band CH1 or CH2.

In the present embodiment, the reception standby period is set such that the second reception standby period T2 is arranged immediately after the first reception standby period T1 through the phase synchronization operation of the phase synchronization circuit 260. Thus, once the reception circuit of the reception unit 220 is activated, the phase synchronization circuit 260 appropriately changes the reference frequency fref input from the communication control device 210 to switch the frequency bands for the wireless signal that can be received by the reception unit 220. Therefore, when continuously receiving the two frequency bands CH1 and CH2, the reception circuits corresponding to the frequency bands CH1 and CH2 do not need to be separately arranged, and each circuit including the phase synchronization circuit 260 does not need to be activated separately according to the transmission timing by the frequency bands CH1 and CH2. As a result, the power consumption is further reduced in addition to simplification of the circuit in the reception unit 220.

The receiver 200R is first activated when parking, stopping and the like of the vehicle is detected based on the vehicle operation and the like by the user on the basis of the above. The activated receiver 200R first operates in the non-power saving mode, and starts and stops the reception circuit of the reception unit 220 under the cycle of 250 ms, for example. After an elapse of a predetermined time Tx from the activation of the receiver 200R, the receiver 200R transitions from the non-power saving mode to the power saving mode to reduce the power consumption. Thus, after the receiver 200R transitions to the power saving mode, the receiver 200R activates the reception circuit under the cycle of 400 ms, for example.

When the portable device 100 transmits the wireless signal of the first frequency band CH1 or the second frequency band CH2 while the reception circuit is activated under such a cycle and is in the reception standby state, that is, while the first reception standby period T1 or the second reception standby period T2 arranged as continuous periods, the reception circuit receives in each corresponding reception standby period T1, T2 regardless of which frequency band the frequency band of the wireless signal is.

As described above, the wireless communication method and the wireless communication apparatus according to the present embodiment have the following advantages.

(1) The reception standby periods T1 and T2 in the receiver 200R are defined separately for the first frequency band CH1 and the second frequency band CH2, respectively, and the cycles of the defined reception standby periods T1 and T2 are set to be smaller than or equal to the specified time Ts, which is the unit of transmission of the wireless signal in the transmitter 100S. Thus, the first and second reception standby periods T1, T2, which correspond to the first and second frequency bands CH1, CH2, respectively, are both included in one specified time Ts. That is, the receiver 200R has an opportunity to receive the wireless signals of all frequency bands transmitted from the transmitter 100S. Thus, even if it is unknown whether the frequency of the wireless signal transmitted from the portable device 100 including the transmitter 100S is the first or second frequency band CH1, CH2, the in-vehicle device 200 including the receiver 200R can receive the wireless signal transmitted over such a frequency band. Thus, high mutual communication establishment can be maintained even when the mutual communication between the transmitter 100S and the receiver 200R is carried out using multiple frequency bands.

(2) The lengths of the intermittent reception standby periods T1 and T2 are the minimum necessary length capable of receiving the wireless signals over the frequency bands. Therefore, the power consumption in the receive 200R is reduced. In other words, it is possible to achieve both maintaining of mutual communication establishment using the frequency bands and the reduction of the power consumption in a favorable manner.

(3) The second reception standby period T2 is continuously arranged immediately after the first reception standby period T1. Thus, since the reception standby periods T1 and T2, which correspond to the first frequency band CH1 and the second frequency band CH2, respectively, are set as a group, an opportunity to receive is given at a relatively close timing with respect to any frequency band.

(4) The reception circuit in the reception unit 220 includes the phase synchronization circuit 260 for outputting the signals in which the phases are synchronized based on the signal input from the communication control device 210. The reception circuit including the phase synchronization circuit 260 is activated in correspondence to each of the reception standby periods T1 and T2. The wireless signal over the frequency band of the frequency bands CH1 and CH2 transmitted from the portable device 100 can be received through the phase synchronization operation by the phase synchronization circuit 260. Thus, once the phase synchronization circuit 260 is activated, the phase synchronization circuit 260 appropriately switches the frequency bands that can be received by the receiver 200R based on the signal input from the communication control device 210. Therefore, when receiving the wireless signals of the multiple frequency bands transmitted from the portable device 100, multiple circuits each corresponding to one of the frequency bands do not need to be arranged separately and such circuits do not need to be separately activated according to the transmission timing by each frequency band. Thus, the number of activation of the reception circuit can be reduced, and the activation current at the time of activation of the reception circuit is reduced. In other words, the power consumption of the receiver 200R is further reduced.

(5) The configuration including the phase synchronization circuit 260 is especially effective when the second reception standby period T2 is continuously arranged immediately after the first reception standby period T1. In other words, both the realization of the reception standby periods in which the reception standby periods T1 and T2 are continuously arranged and the reduction of the activation current are achieved in a favorable manner.

(6) The receiver 200R receives the wireless signals in the reception standby periods T1, T2 based on the second cycles Tpb1, Tpb2 in the power saving mode and receives the wireless signals in the reception standby periods T1, T2 based on the first cycles Tpa1, Tpa2 in the non-power saving mode. The second cycles Tpb1, Tpb2 are longer than the first cycles Tpa1, Tpa2. Thus, in the power saving mode, the intermittent time of the reception standby periods T1 and T2 is expanded, so that the receiver 200R can receive the wireless signal transmitted from the portable device 100 under lower power consumption.

(7) The transmission and reception (periodic communication) are carried out based on the frequency band CH1 defined in advance between the portable device 100 and the in-vehicle device 200. The second reception standby period T2, which corresponds to the second frequency band CH2, is set by reference to the first reception standby period T1, which corresponds to the first frequency band CH1 used in the periodic communication. The reception standby periods T1 and T2, which correspond to the frequency bands CH1 and CH2, are thus easily set. Both the periodic communication necessary for authentication between the portable device 100 and the in-vehicle device 200 and the mutual communication based on the remote keyless entry system are achieved in a favorable manner.

Second Embodiment

A wireless communication method and a wireless communication apparatus according to a second embodiment of the present invention will be hereinafter described with reference to FIG. 4. The basic configuration of the second embodiment is common with the first embodiment other than that only the wireless signal of the frequency band specified in advance is receivable in the power saving mode.

Figures 4A, 4B, 4C:
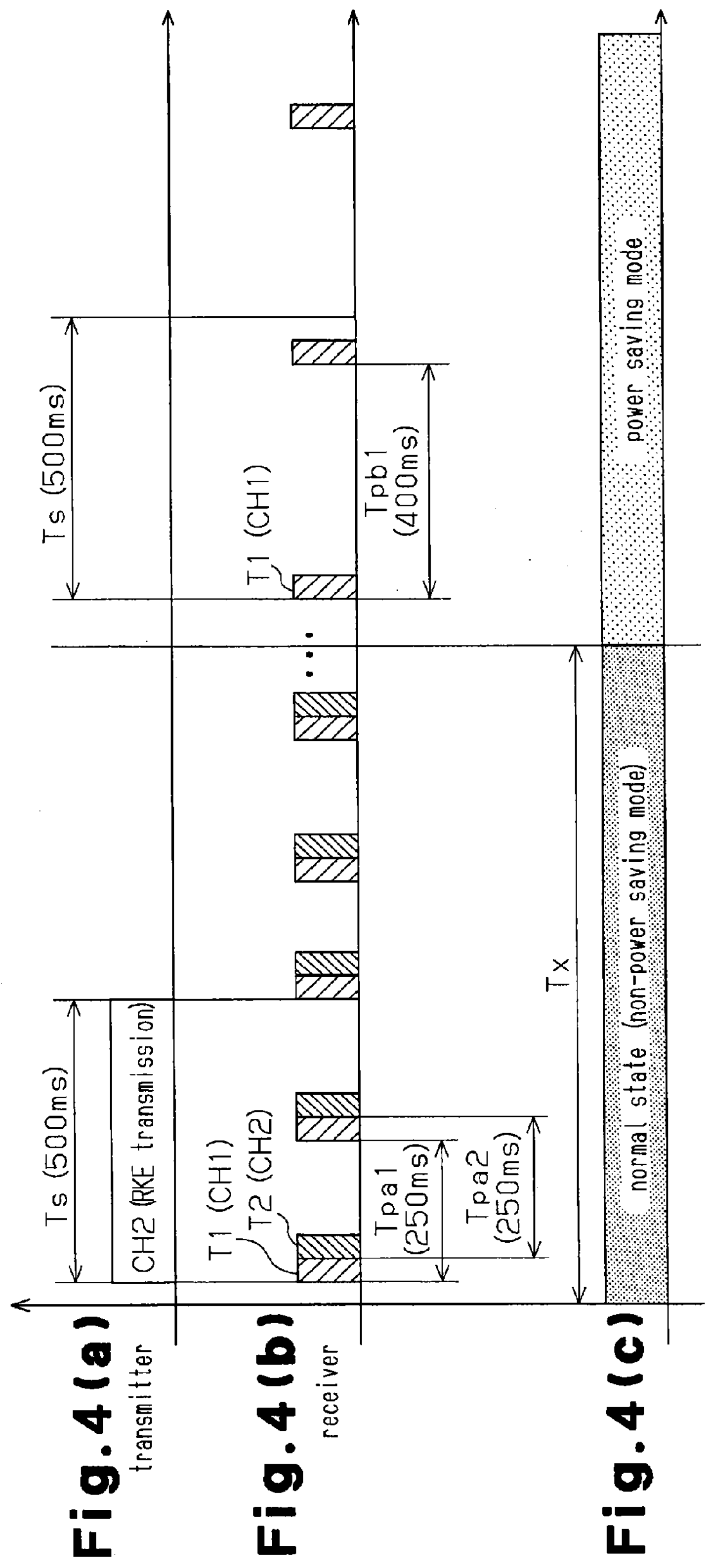
FIGS. 4(*a*) to 4(*c*) are timing charts showing one example of the reception of the wireless signals according to a second embodiment of the present invention.

FIG. 4 is a diagram corresponding to FIG. 3, and shows an arrangement of the reception standby period in the second embodiment. In FIG. 4, FIG. 4(*a*) shows one example of the wireless signal transmitted from the portable device 100 under the set specified time, and FIG. 4(*b*) shows a transition example of the reception standby period defined for the receiver 200R as a period in which the wireless signal can be received. FIG. 4(*c*) shows a transition example of the standby state (power saving mode/non-power saving mode) of the receiver 200R. In FIG. 4, the same reference numeral and symbols are denoted on the same elements as the elements shown in FIGS. 1 to 3, and the redundant description on such elements will be omitted.

As shown in FIGS. 4(*b*) and 4(*c*), in the present embodiment, when the receiver 200R transitions from the non-power saving mode to the power saving mode after an elapse of the predetermined time Tx from the activation of the receiver 200R, the receiver 200R can receive only the first frequency band CH1 for periodic communication specified in advance. In other words, the receiver 200R can receive only the wireless signal of the frequency band CH1 for periodic communication in the first reception standby period T1 based on the second cycle Tpb1. Thus, the cycle of the first reception standby period T1 in the receiver 200R, that is, the activation frequency of the reception circuit is further reduced while guaranteeing the minimum necessary communication establishment by having the receive 200R receiving only the wireless signal of the specifiable frequency band CH1 in the power saving mode. The power consumption of the receiver 200R is thus further reduced.

Even if only the wireless signal of the frequency band CH1 can be received, the frequency band used in the wireless transmission can be automatically switched through the switch operation by the user. Therefore, the communication establishment between the portable device 100 and the in-vehicle device 200 serving as the remote keyless entry system is guaranteed.

As described above, the wireless communication method and the wireless communication apparatus according to the present embodiment further have the following advantage in addition to the advantages (1) to (7).

(8) In the power saving mode, the receiver 200R can receive only the wireless signal of the first frequency band CH1 specified in advance for periodic communication in the first reception standby period T1 based on the second cycle Tpb1. The cycle of the first reception standby period T1 in the receiver 200R, that is, the activation frequency of the reception circuit is further reduced and the power consumption is further reduced while guaranteeing the minimum necessary communication establishment between the portable device 100 and the in-vehicle device 200.

Third Embodiment

A wireless communication method and a wireless communication apparatus according to a third embodiment of the present invention will be hereinafter described with reference to FIG. 5. The basic configuration of the third embodiment is common with the first embodiment other than that the first reception standby period T1 and the second reception standby period T2 are arranged in a mode distributed by a predetermined interval.

Figures 5A, 5B, 5C:
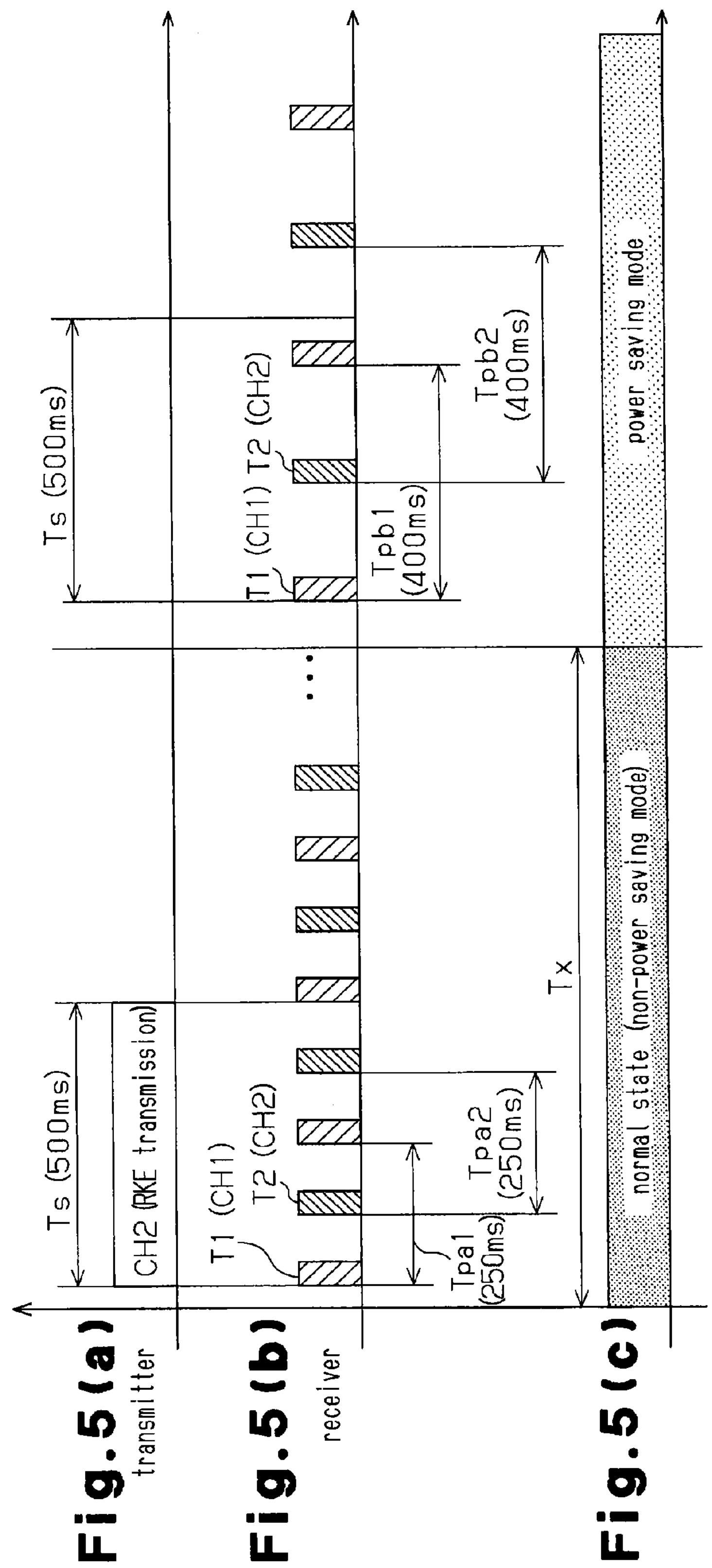
FIGS. 5(*a*) to 5(*c*) are timing charts showing one example of the reception of the wireless signals according to a third embodiment of the present invention.

FIG. 5 is a diagram corresponding to FIG. 3, and shows an arrangement of the reception standby period in the third embodiment. In FIG. 5, FIG. 5(*a*) shows one example of the wireless signal transmitted from the portable device 100 under the set specified time, and FIG. 5(*b*) shows a transition example of the reception standby period defined for the receiver 200R as a period in which the wireless signal can be received. FIG. 5(*c*) shows a transition example of the standby state (power saving mode/non-power saving mode) of the receiver 200R. In FIG. 5, the same reference numerals and symbols are denoted on the same elements as the elements shown in FIGS. 1 to 3, and the redundant description on such elements will be omitted.

As shown in FIGS. 5(*b*) and 5(*c*), the cycle Tpa1 of the first reception standby period T1, in which the wireless signal of the first frequency band CH1 can be received, is 250 ms, which is a half of the specified time Ts, in the non-power saving mode of the present embodiment. The second reception standby period T2 is arranged by reference to the first reception standby period T1. In the present embodiment, the second reception standby period T2 is arranged at a center position between the positions where the adjacent first reception standby periods T1 are arranged. In other words, the second reception standby period T2, which corresponds to the frequency band CH2, is arranged while being temporally separated after the first reception standby period T1, which corresponds to the frequency band CH1. The cycle Tpa2 of the second reception standby period T2 in the non-power saving mode is also 250 ms, which is a half of the specified time Ts. Thus, in the present embodiment, the first reception standby period T1 and the second reception standby period T2 are alternately arranged at an equal interval.

As shown in FIGS. 5(*b*) and 5(*c*), the cycle Tpb1 of the first reception standby period T1 is 400 ms, which is smaller than or equal to the specified time Ts in the power saving mode. The cycle Tpb2 of the second reception standby period T2 arranged at an intermediate point of the adjacent first reception standby periods T1 is also 400 ms, which is smaller than or equal to the specified time Ts.

Therefore, in the present embodiment as well, the first and second reception standby periods T1, T2 are included at any timing in the one specified time Ts, which is the unit of transmission of the wireless communication by the portable device 100. The in-vehicle device 200 thus can reliably receive the wireless signals of the frequency bands CH1 and CH2 even if it is unknown whether the frequency band of the wireless signal transmitted from the portable device 100 is the frequency band CH1 or CH2.

The opportunity for the receiver 200R to receive the wireless signals transmitted from the portable device 100 is thus given at an equal interval to both the first and second frequency bands CH1, CH2 by alternately arranging the first and second reception standby periods T1, T2 at an equal interval.

The receiver 200R is first activated when parking, stopping and the like of the vehicle is detected based on the vehicle operation and the like performed by the user on the basis of the above. The activated receiver 200R first operates in the non-power saving mode, and starts and stops the reception circuit of the reception unit 220 under the cycle of 250 ms, for example. After an elapse of a predetermined time Tx from the activation of the receiver 200R, the receiver 200R transitions from the non-power saving mode to the power saving mode to reduce the power consumption. Thus, after the receiver 200R transitions to the power saving mode, the receiver 200R activates the reception circuit under the cycle of 400 ms, for example.

When the portable device 100 transmits the wireless signal of the first frequency band CH1 or the second frequency band CH2 while the reception circuit is activated under such a cycle and is in the reception standby state, that is, during the first reception standby period T1 or the second reception standby period T2, which are alternately arranged, the reception circuit receives in each of the corresponding reception standby periods T1, T2 regardless of which frequency band the frequency band of the wireless signal is.

As described above, the wireless communication method and the wireless communication apparatus according to the present embodiment further have the following advantage in addition to the advantages (1), (2), (4), (6), (7) and in place of the advantage (3).

(3A) The second reception standby period T2 is arranged at the center position between the positions where the adjacent first reception standby periods T1 are arranged, by reference to the first reception standby period T1. Thus, the first reception standby period T1 and the second reception standby period T2 are alternately arranged at an equal interval. The opportunity for the receiver 200R to receive the wireless signals transmitted from the portable device 100 is thus given at an equal interval to both the first and second frequency bands CH1, CH2.

Fourth Embodiment

A wireless communication method and a wireless communication apparatus according to a fourth embodiment of the present invention will be hereinafter described with reference to FIG. 6. The basic configuration of the fourth embodiment is common with the third embodiment other than that only the wireless signal of the frequency band specified in advance is receivable in the power saving mode in the third embodiment.

Figures 6A, 6B, 6C:
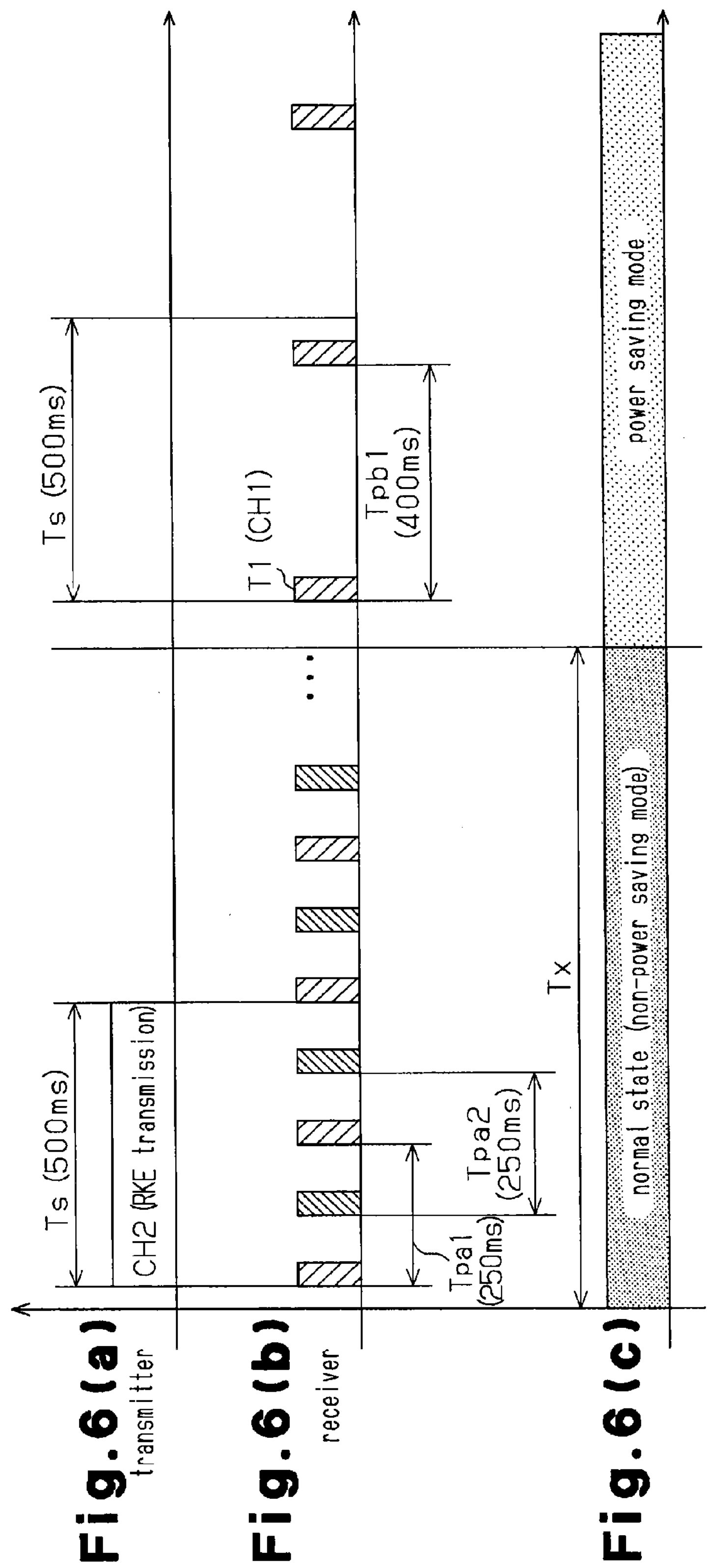
FIGS. 6(*a*) to 6(*c*) are timing charts showing one example of the reception of the wireless signals according to a fourth embodiment of the present invention.
Figure 7:
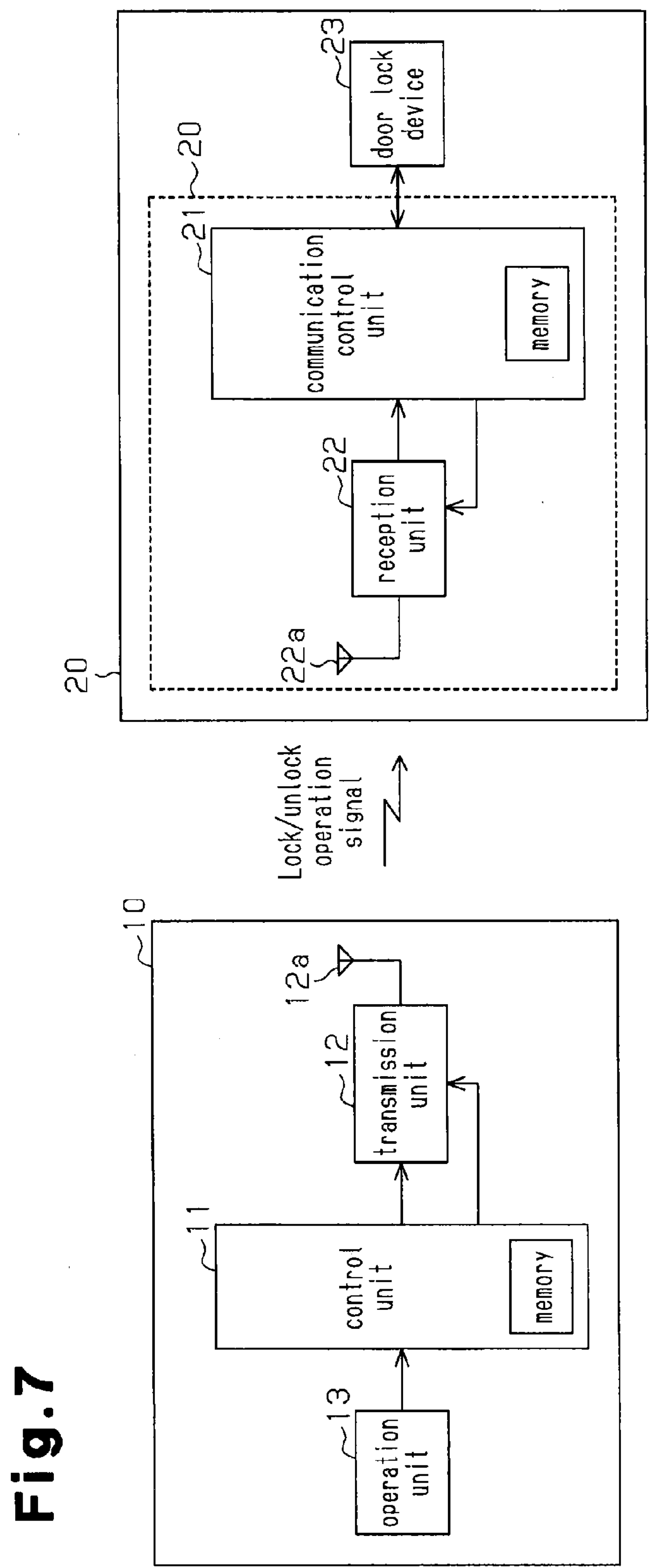
FIG. 7 is a schematic block diagram of a conventional wireless communication apparatus.
Figure 8:
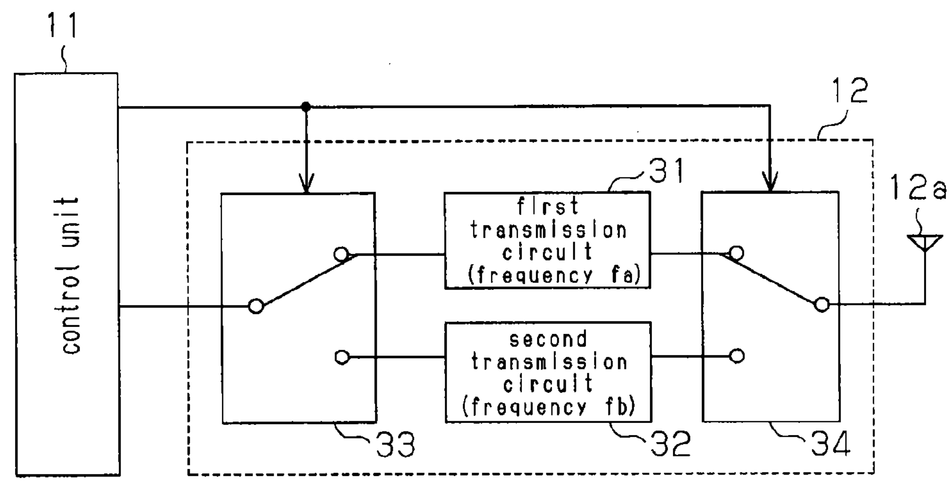
FIG. 8 is a schematic block diagram of a transmission unit of FIG. 7.
Figure 9:
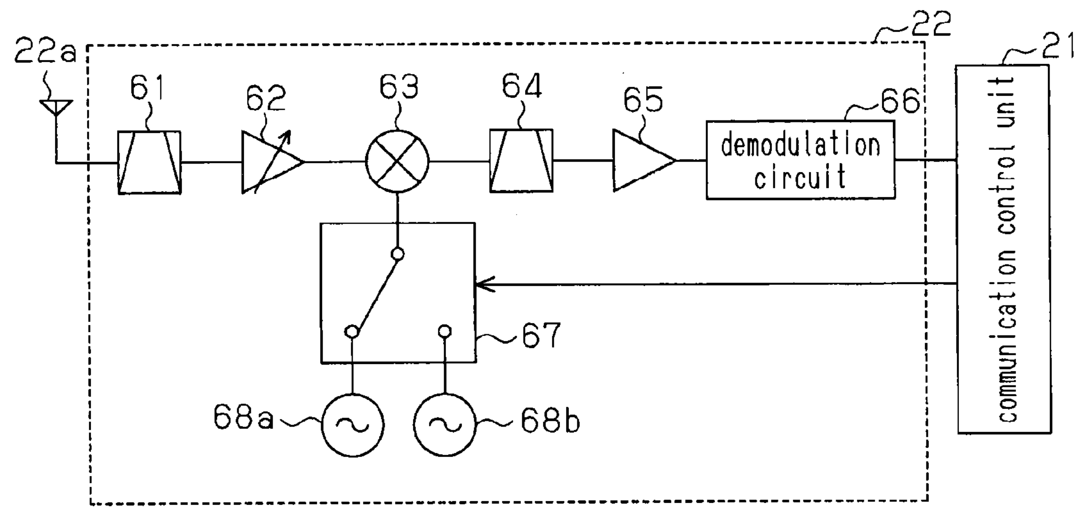
FIG. 9 is a schematic block diagram of a reception unit of FIG. 7.

FIG. 6 is a diagram corresponding to FIG. 3, and shows an arrangement of the reception standby period in the fourth embodiment. In FIG. 6, FIG. 6(*a*) shows one example of the wireless signal transmitted from the portable device 100 under the set specified time, and FIG. 6(*b*) shows a transition example of the reception standby period defined for the receiver 200R as a period in which the wireless signal can be received. FIG. 6(*c*) shows a transition example of the standby state (power saving mode/non-power saving mode) of the receiver 200R. In FIG. 6, the same reference numerals and symbols are denoted on the same elements as the elements shown in FIGS. 1 to 3, and the redundant description on such elements will be omitted.

As shown in FIGS. 6(*b*) and 6(*c*), the receiver 200R transitions from the non-power saving mode to the power saving mode after an elapse of the predetermined time Tx from the activation of the receiver 200R in the present embodiment. The receiver 200R can receive only the wireless signal of the first frequency band CH1 for periodic communication specified in advance. In other words, the wireless signal of the frequency band CH1 for periodic communication can be received in the first reception standby period T1 based on the second cycle Tpb1. Thus, the cycle of the first reception standby period T1 in the receiver 200R, that is, the activation frequency of the reception circuit is further reduced while guaranteeing the minimum necessary communication establishment by having the receive 200R receiving only the wireless signal of the specifiable frequency band CH1 in the power saving mode. The power consumption of the receiver 200R is thus further reduced.

Even if only the frequency band CH1 can be received, the frequency band used in the wireless transmission can be automatically switched through the switch operation by the user. Therefore, the communication establishment between the portable device 100 and the in-vehicle device 200 serving as the remote keyless entry system is guaranteed.

As described above, the wireless communication method and the wireless communication apparatus according to the present embodiment further have the following advantage in addition to the advantages (1), (2), (3A) (4), (6), and (7).

(8A) In the power saving mode, the receiver 200R can receive only the wireless signal of the first frequency band CH1 specified in advance for periodic communication in the first reception standby period T1 based on the second cycle Tpb1. The cycle of the first reception standby period T1 in the receiver 200R, that is, the activation frequency of the reception circuit is further reduced and the power consumption is further reduced while guaranteeing the minimum necessary communication establishment between the portable device 100 and the in-vehicle device 200.

Each of the embodiments described above may be modified as follows.

In each of the embodiments described above, the specified time Ts, in which the wireless signal corresponding to the switch operation is transmitted, is 500 ms. The first cycles Tpa1 and Tpa2 of each of the reception standby periods T1 and T2 are 250 ms, and the second cycles Tpb1 and Tpb2 of the reception standby periods T1 and T2 are 400 ms. Not limited thereto, an arbitrary time can be set for the specified time Ts, the first cycles Tpa1 and Tpa2, and the second cycles Tpb1 and Tpb2. The cycle of each of the reception standby periods T1 and T2 merely needs to be smaller than or equal to the specified time Ts, which is the unit of transmission of the wireless signal.

In the third and fourth embodiments, the second reception standby period T2 is arranged at the center position between the positions where the adjacent first reception standby periods T1 are arranged by reference to the first reception standby period T1. Not limited thereto, the second reception standby period T2 merely needs to be sequentially arranged between the adjacent first reception standby periods T1 by reference to the first reception standby period T1.

In the second and fourth embodiments, the receiver 200R receives only the wireless signal of the first frequency band CH1 in the first reception standby period T1 based on the second cycle Tpb1 in the power saving mode. Not limited thereto, the receiver 200R may be capable of receiving only the wireless signal of the second frequency band CH2 in the second reception standby period T2 based on the second cycle Tpb2 in the power saving mode. In other words, the frequency band of the wireless signal receivable in the power saving mode of the receiver 200R is arbitrary.

In each of the embodiments described above, the wireless signal transmitted and received between the portable device 100 and the in-vehicle device 200 includes the periodic communication transmitted and received based on the first frequency band CH1 specified in advance. The reception standby periods T1 and T2 are set by reference to the reception standby period T1 of the first frequency band CH1 used in the periodic communication. Not limited thereto, the periodic communication does not necessarily need to be carried out between the portable device 100 and the in-vehicle device 200, and the reception standby periods T1 and T2 may be set by reference to an arbitrary frequency band among the frequency bands used in the wireless communication.

In each of the embodiments, the receiver 200R receives the wireless signals in the reception standby periods T1, T2 based on the second cycles Tpb1, Tpb2 in the power saving mode and receives the wireless signals in the reception standby periods T1, T2 based on the first cycles Tpa1, Tpa2 in the non-power saving mode. Not limited thereto, the switching of the power saving mode/non-power saving mode in the receiver 200R may be omitted, and the wireless signals in the reception standby periods T1, T2 may be received based only on either the first cycles Tpa1, Tpa2 or the second periods Tpb1, Tpb2.

In each of the embodiments, the reception circuit in the receiver 200R includes the phase synchronization circuit 260, and the wireless signals of the frequency bands transmitted from the portable device 100 can be received through the phase synchronization operation of the phase synchronization circuit 260. Not limited thereto, the reception circuit of the receiver 200R may include a plurality of oscillators capable of receiving a predetermined frequency band, so that multiple frequency bands can be received through selection of the oscillator.

In each of the embodiments described above, the first and second frequency bands CH1, CH2 are used for the wireless communication between the portable device 100 and the in-vehicle device 200. Not limited thereto, three or more frequency bands may be used for the wireless communication between the portable device 100 and the in-vehicle device 200, and the frequency bands transmitted from the portable device 100 may be sequentially switched each time the user performs the switch operation. In this case as well, when the reception standby period corresponding to the number of frequency bands transmitted from the portable device 100 is:

a. With the reception standby period defined in correspondence with one frequency band among the frequency bands as a reference, the reception standby period of each of other frequency bands is sequentially and continuously arranged after the reception standby period serving as a reference; or b. With the reception standby period defined in correspondence with one frequency band among the frequency bands as a reference, the reception standby period of each of other frequency bands is arranged to be positioned between the adjacent reception standby periods serving as a reference, the advantages complying with (1) to (7) and (3A) described above are thereby obtained.

The reception standby period may be arranged in the order of greater number of communication successes in the corresponding frequency band. In this case, the communication between the portable device 100 and the in-vehicle device 200 can be established faster even in the communication format that uses multiple frequency bands for the wireless communication.

In the first and second embodiments, the second reception standby period T2 is continuously arranged after the first reception standby period T1 by reference to the first reception standby period T1. In the third and fourth embodiments, the second reception standby period T2 is arranged between the adjacent first reception standby periods T1 by reference to the first reception standby period T1. In addition, for example, each of the reception standby periods may be arranged such that the reception standby period corresponding to the same frequency band continues. That is, each of the reception standby periods merely needs to be defined separately for each of the frequency bands and the cycle of each of the defined reception standby periods is to be smaller than or equal to the specified time, which is the unit of transmission of the wireless signal, such that the wireless signals transmitted from the portable device 100 are intermittently received at a predetermined cycle.

In each of the embodiments described above, the wireless communication method and the wireless communication apparatus are applied to the keyless entry system of the vehicle. In addition, the wireless communication method or the wireless communication apparatus may be applied to the security system of a residential building, or the like. The present invention thus can be applied to an arbitrary system in which a command content corresponding to an ON operation of a switch is transmitted and received using multiple frequency bands between a transmitter and a receiver.

The invention claimed is:

1. A wireless communication method comprising:

switching a frequency band from among a plurality of predetermined frequency bands each time a manual switch operation is performed with a transmitter to transmit a wireless signal corresponding to the manual switch operation using the frequency band for a predetermined specified transmission time, the plurality of predetermined frequency bands including a first predetermined frequency band and a second predetermined frequency band;

receiving the transmitted wireless signal with a receiver and recognizing a command content assigned in advance in correspondence with the switch operation;

defining a first intermittent reception standby period, which is repeated at a first predetermined cycle, for the first predetermined frequency band and a second intermittent reception standby period, which is repeated at a second predetermined cycle, for the second predetermined frequency band, the receiver being capable of receiving the wireless signal transmitted using the first predetermined frequency band during the first standby period and using the second predetermined frequency band during the second standby period; and setting the first predetermined cycle of the first intermittent reception standby period and the second predetermined cycle of the second intermittent reception standby period to be smaller than or equal to the predetermined specified transmission time, wherein the first intermittent reception standby period is arranged temporally spaced apart from the second intermittent reception standby period.

2. The wireless communication method according to claim 1, wherein the first and second intermittent reception standby periods are arranged at an equal interval.

3. The wireless communication method according to claim 1, wherein the first and second intermittent reception standby periods are arranged in an order of greater number of communication successes.

4. The wireless communication method according to claim 1, further comprising:

setting the first predetermined cycle of the first intermittent reception standby period and the second predetermined cycle of the second intermittent reception standby period to a first cycle when the receiver is in a non-power saving mode, which is a normal reception standby mode; and setting the first predetermined cycle of the first intermittent reception standby period and the second predetermined cycle of the second intermittent reception standby period to a second cycle, which is longer than the first cycle, when the receiver is in a power saving mode for reducing power consumption.

5. The wireless communication method according to claim 4, further comprising, in the power saving mode, setting only one of the first intermittent reception standby period and the second intermittent reception standby period that corresponds to a frequency band designated in advance.

6. The wireless communication method according to claim 1, wherein the wireless signal includes a communication signal periodically transmitted using a frequency band specified in advance, and the first intermittent reception standby period and the second intermittent reception standby period are defined by reference to an intermittent reception standby period corresponding to the frequency band specified in advance.

7. A wireless communication apparatus comprising:

a transmitter with a manually operable switch; and a receiver, wherein the transmitter and the receiver include circuitry configured to carry out wireless communication between the transmitter and the receiver according to the wireless communication method according to claim 1.

8. The wireless communication apparatus according to claim 7, wherein the receiver includes a reception unit with a reception circuit, which receives the wireless signal, a control unit, which switches the frequency band receivable by the reception unit, and an activation unit, which activates the reception circuit, the reception circuit has a phase synchronization circuit, which outputs a signal the phase of which is synchronized based on a signal input from the activation unit, and the activation unit activates the phase synchronization circuit in correspondence with the first and second intermittent reception standby periods such that the reception circuit is in a state where wireless signals of a plurality of frequency bands transmitted from the transmitter can be received through a phase synchronization operation of the phase synchronization circuit.

9. A wireless communication system comprising:

a transmitter with a manually operable switch; and a receiver, wherein the transmitter and the receiver include circuitry configured to:

switch a frequency band from among a plurality of predetermined frequency bands each time a manual switch operation is performed with the transmitter to transmit a wireless signal corresponding to the manual switch operation using the frequency band for a predetermined specified transmission time, the plurality of predetermined frequency bands including a first predetermined frequency band and a second predetermined frequency band;

receive the transmitted wireless signal with the receiver and recognizing a command content assigned in advance in correspondence with the switch operation;

define a first intermittent reception standby period, which is repeated at a first predetermined cycle, for the first predetermined frequency band and a second intermittent reception standby period, which is repeated at a second predetermined cycle, for the second predetermined frequency band, the receiver being capable of receiving the wireless signal transmitted using the first predetermined frequency band during the first reception standby period and using the second predetermined frequency band during the second standby period; and set the first predetermined cycle of the first intermittent reception standby period and the second predetermined cycle of the second intermittent reception standby period to be smaller than or equal to the predetermined specified transmission time, and a first intermittent reception standby period is arranged temporally spaced apart from the second intermittent reception standby period.

10. The wireless communication system according to claim 9, wherein the receiver is mounted in a vehicle, and the transmitter is mounted in a portable unlock/lock device.

11. The wireless communication system according to claim 10, wherein the command content includes one of a lock command and an unlock command.

12. The wireless communication system according to claim 9, wherein the command content includes one of a lock command and an unlock command.

* * * * *